UNITED STATES PATENT OFFICE.

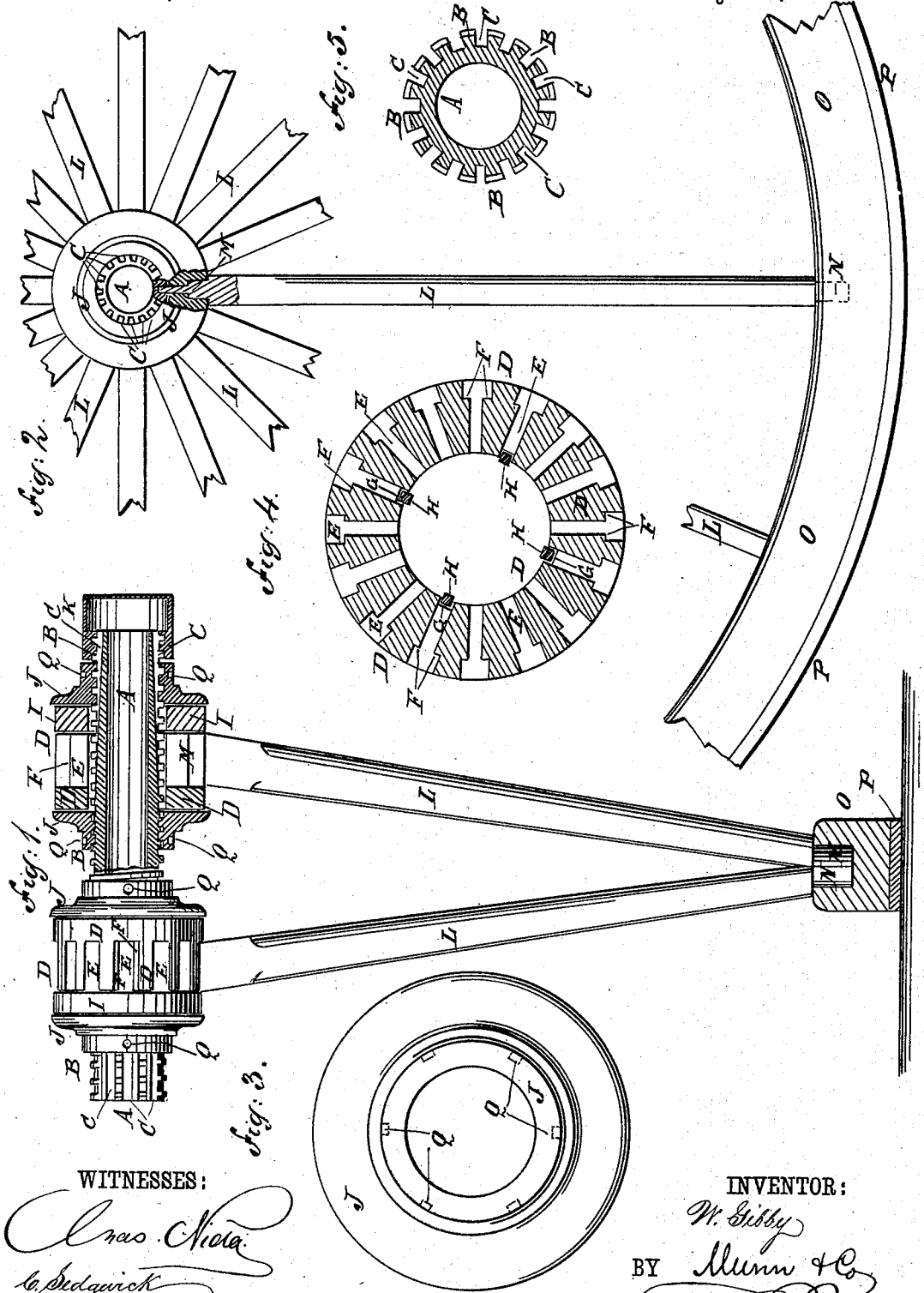

WILLIAM GIBBY, OF RAHWAY, NEW JERSEY.

VEHICLE-WHEEL.

SPECIFICATION forming part of Letters Patent No. 322,174, dated July 14, 1885.

Application filed August 18, 1884. (No model.)

*To all whom it may concern:*

Be it known that I, WILLIAM GIBBY, of Rahway, in the county of Union and State of New Jersey, have invented certain new and useful Improvements in Wheels for Wagons and other Vehicles, of which the following is a full, clear, and exact description.

Reference is to be had to the accompanying drawings, forming a part of this specification, in which similar letters of reference indicate corresponding parts in all the figures.

Figure 1 is a front elevation, partly in section, of a part of one of my improved wheels; and Fig. 2 is a side elevation of a part of a wheel, part being broken away. Fig. 3 is an elevation of a nut. Fig. 4 is a sectional end elevation of a hub-section; and Fig. 5 is a sectional end elevation of the hub-box on an enlarged scale.

The object of this invention is to provide wheels for wagons and other vehicles, constructed in such a manner that the wheels can be readily adjusted to cause the vehicles to track wider or narrower, to tighten or slacken the rims, and to allow any desired part of the wheels to be removed and replaced without its being necessary to take the whole wheel apart.

The invention consists in a vehicle-wheel constructed with a hub-box having exterior screw-thread and tapered longitudinal grooves, hub-sections sliding upon the hub-box and having radial slots in their outer parts to receive the spokes, washers covering the open ends of the section-slots, and nuts for holding and adjusting the hub-sections and the spokes, fellies, and tire, as will be hereinafter fully described.

A is the hub-box, which is designed to fit upon the axle and be secured in place by a nut in the ordinary manner. Upon the outer surface of the hub-box A is formed a screw-thread, B, extending continuously from end to end of the said box. In the end parts of the outer surface of the hub-box A are formed longitudinal grooves C, which are deepest at their outer ends, gradually decrease in depth to their inner ends, and terminate at a little distance from the center of the said hub-box.

D are the hub-sections, which are made with bores of such a size that the said sections will slide freely on the hub-box A. In the sections D are formed radial slots E, extending from their outer ends nearly to the inner ends, leaving the said inner ends solid. The outer parts of the slots E are widened, forming shoulders F, as shown in Figs. 1 and 4. In the inner surface of the solid inner ends of the hub-sections D are formed grooves G, corresponding in position with the grooves C of the hub-box A, so that keys H can be inserted in the said grooves C G to hold the said hub-sections D from turning on the said hub-box A. Upon the outer parts of the hub-box A are placed annular washers I to rest against the outer ends of the hub-sections D and cover the outer ends of the slots E. Upon the hub-box A are screwed four nuts, J, which rest against the solid inner ends of the hub-sections D and the outer sides of the washers I to hold the said hub-sections in place. The ends of the hub-box A are covered by screw-caps K, which are made with bodies of such a length as will allow the said caps K to be screwed up against the outer nuts J, however the hub-sections D may be adjusted.

L are the spokes, the tenons M upon the inner ends of which are formed with shoulders, so that the inner ends of the said spokes will bear against the outer surfaces of the hub-sections D and against the shoulders F of the said sections D. The tenons M may be made of such a length that their ends will enter the grooves C of the hub-box A; or the said ends may terminate at or near the inner surfaces of the hub-sections D. The tenons N of the outer ends of the spokes L are so formed that the two tenons of the opposite spokes of the two sections D will enter the same hole in the felly O, as shown in Fig. 1. The fellies O are provided with a tire, P, in the ordinary manner.

To put the wheel together the outer nuts J and the washers I are removed, and the hub-sections D are moved outward. The fellies O are inserted in the tire P, and the outer tenons, N, of the spokes L are inserted in the sockets in the said fellies, and their inner tenons, M, are inserted in the slots E of the hub-sections D. The hub-sections D are then moved inward or toward each other as far as they will go, and the washers I and outer nuts J are then put on, and the said nuts J are screwed up until the desired tension has been given to the wheel. The inner nuts J are then screwed outward against the solid inner ends of the hub-sections, locking the various parts of the wheel firmly together. The nuts J have recesses Q formed in the outer surfaces of their hubs to receive a wrench for screwing them on and off. With this construction, by adjusting the nuts J and sections D, the rims of the wheels can be moved inward or outward to cause the wagon to track narrower or wider, as may be desired. By adjusting the sections D inward or outward equally the wheel can be tightened or slackened, as may be required, to compensate for the shrinkage and swelling of the wooden parts of the said wheel, and any desired part of the wheel can be removed and replaced without taking the entire wheel apart. In case less strength is needed and lighter wheels are required the alternate spokes in the hub-section can be omitted, producing a wheel with staggered spokes.

Having thus described my invention, I claim and desire to secure by Letters Patent—

1. In a vehicle-wheel, the hub-box A, made, substantially as herein shown and described, with exterior screw-thread and tapered longitudinal grooves, whereby the said hub-box is adapted to receive the spoke-holding sections and their nuts, as set forth.

2. In a vehicle-wheel, the combination, with the hub-box A, having exterior screw-thread and tapered longitudinal grooves, of the adjustable hub-sections D, having radial slots in their outer parts, the washers I, and the adjusting-nuts J, substantially as herein shown and described, whereby the inner ends of the spokes will be firmly supported and can be readily adjusted, as set forth.

WILLIAM GIBBY.

Witnesses:
JAMES T. GRAHAM,
C. SEDGWICK.